UNITED STATES PATENT OFFICE.

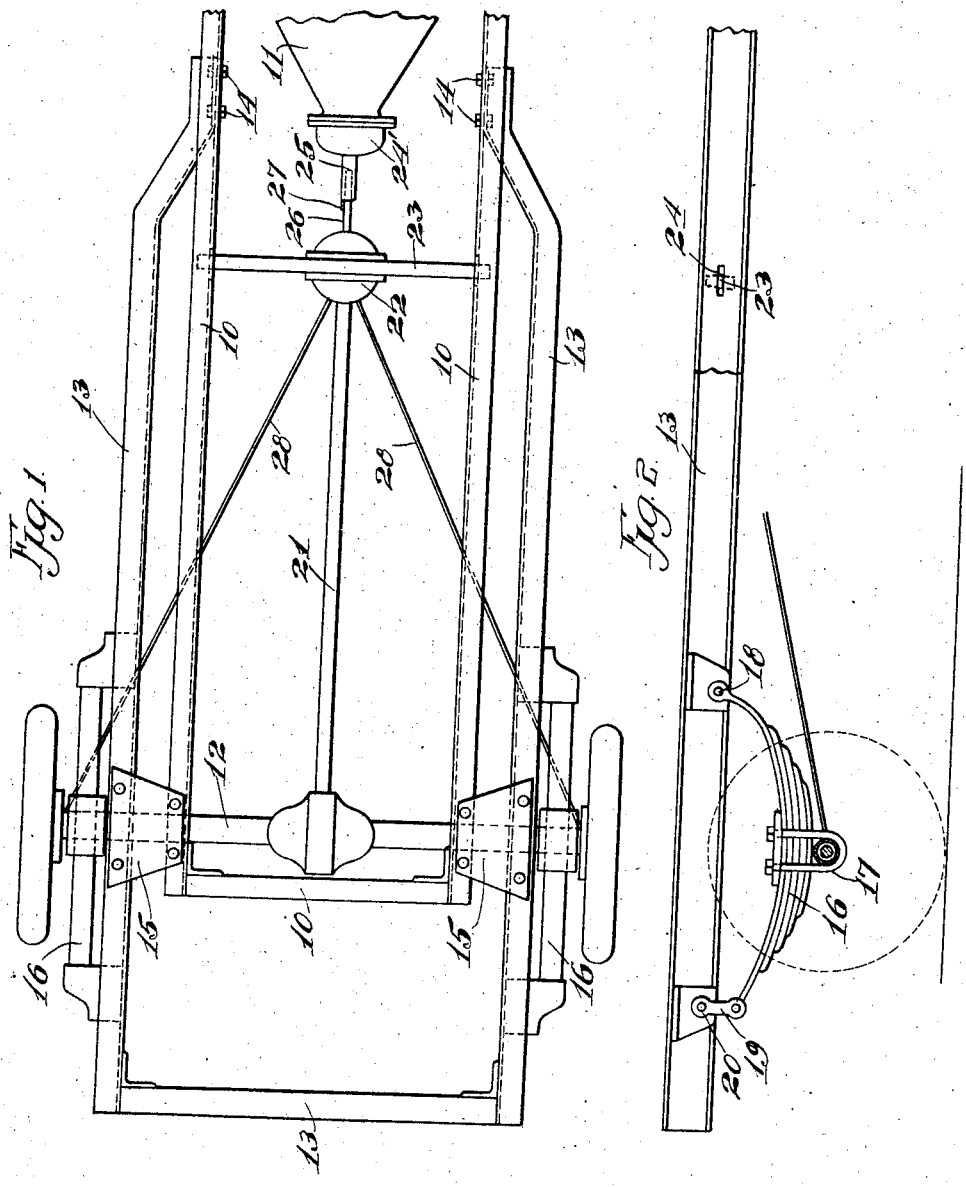

HOWARD R. BRUAH, OF CHICAGO, ILLINOIS.

EXTENDIBLE TRUCK CONSTRUCTION.

1,392,395.  Specification of Letters Patent.  Patented Oct. 4, 1921.

Application filed February 2, 1920. Serial No. 355,617.

*To all whom it may concern:*

Be it known that I, HOWARD R. BRUAH, a citizen of the United States, residing at Chicago, in the county of Cook and State of Illinois, have invented a new and useful Improvement in Extendible Truck Constructions, of which the following is a specification.

My invention relates to an improved form of extendible truck construction having for its object making an improved construction of a standard construction on the market by adding thereto an extension frame and providing devices for eliminating inherent defects in said truck construction.

In a certain truck construction the rear end is supported upon the rear axle by a cross spring and the axle is braced by means of radius rods extending directly to the transmission casing. The propeller shaft extending from the rear axle to the transmission casing also makes a rigid connection as a result of which, while the device answers satisfactorily when used without extensive jars or strains, the transmission casing and the parts contained therein and connected therewith are subjected to excessive strains when the rear wheels are subjected to excessive shocks such for example as backing against a curb. This has caused considerable difficulty in the past and it is an object of my invention to provide devices for modifying this standard construction and at the same time to strengthen the device so that it is capable of handling a heavier load.

My invention will best be understood by reference to the accompanying drawings in which;

Figure 1 shows in plan view the framework of the standard truck under consideration and my attachments thereto, and Fig. 2 shows the parts shown in Fig. 1 in side elevation.

Similar numerals refer to similar parts throughout the several views.

As shown in the drawings the frame 10 of the standard truck construction is provided at its front end with a transmission casing 11 supported in a well known manner not shown, and the rear axle 12 of said truck is shown moved to the extreme rear end of the frame 10. An extension frame 13 is disposed outside of the frame 10 and to the rear of the rear end of said frame and is secured to the frame 10 at its front end by bolts 14 and at the rear end of the frame 10 said extension frame is secured thereto by means of the plates 15 connecting the two frames together so that they in effect constitute one frame. The spring and parts originally connecting the axle 12 with the frame 10 are removed and instead, said axle is connected by longitudinally extending side springs 16 to the side members of the frame 13. The springs are connected with the axle in any desired manner as for example by means of bolts 17 the front end of each spring being connected as indicated in Fig. 2 at 18 by means of a pivotal connection to the frame 13, while the rear end of each spring as indicated in said figure is pivotally connected with the lower end of a link 19 the upper end of which is connected at 20 with the side member of the frame 13 thus constituting what is known as the "Hotchkiss" drive. As a result of this construction any strain exerted upon the rear axle by the wheels connected therewith, is communicated directly through the springs 16 at their pivotally connections 18 to the frame 13.

The propeller shaft 21, originally a part of the truck construction, extends forward from the axle 12 to a universal joint connection 22 supported in my construction by a cross bar 23 the ends of which extend through the slots 24 in the side members of the frame 10. The rear end of the transmission casing 11 which is left open by the removal of the housing of the rear portion of the universal joint 22 is inclosed by a suitable cap 24′ through which a short tubular shaft 25 projects rearwardly from the transmission mechanism, this tubular shaft being engaged by a short shaft 26 extending forwardly from the universal joint 22, the engagement between the shafts 25 and 26 being effected by means of a feather key 27 so that one shaft may move longitudinally relatively to the other but that relative rotation between said shafts is impossible. The radius rods 28 employed in the original truck construction extend in my improved construction from the rear axle to the housing of the universal connection 22.

From the above it will appear that by my construction, while the propeller shaft 21 originally connected the rear axle directly with the transmission casing 11 without longitudinal slip of any kind, I provide a means for permitting longitudinal motion of the propeller shaft 21 by means of the slip joint between the shafts 25 and 26, since the cross member 23 may slide longitudinally of the truck frame 10 as the rear axle moves up and down relatively to the frame or when for any other reason it is slightly displaced longitudinally of the frame. It will further appear that since the radius rods are now connected directly with the casing of the universal joint 22 that there is no connection whatever between the rear axle and the transmission casing, as a result of which none of the blows or shocks to which the rear axle and wheels connected therewith are subjected will be communicated to the transmission casing. Lateral motion of the cross member 23 relatively to the frame 10 is prevented by shoulders on the end of said cross member adjacent the smaller portions extending into the slots 24.

While I have shown my invention in the particular embodiment above described, it will be understood that I do not limit myself to this exact construction as I may employ equivalents known to the art at the time of the filing of this application without departing from the scope of the appended claims.

It will be understood, that by my invention, to produce the improved truck construction, the original assembly consisting of the rear axle, propeller shaft and differential gearing connecting them, is not disturbed and that a somewhat longer wheel base results than that of the original truck, since the front end of the original truck including the transmission casing and its gearing remains undisturbed.

What I claim is:

1. As a means for re-building a truck having a rear axle, differential gearing on said axle, a transmission mechanism, a propeller shaft rigidly connecting said differential gearing and said transmission mechanism longitudinally, a main frame and a cross spring between said frame and said axle, in combination with said rear axle, differential gearing and propeller shaft, transmission mechanism, and said main frame, an extension frame, rigid connections between said frames, side springs between said extension frame and said axle engaging at their ends fixed pivot rods carried by said extension frame, a cross member on said main frame supporting the front end of said propeller shaft, and driving devices connecting said transmission mechanism and the front end of said propeller shaft permitting longitudinal slip in said connecting devices, said cross member having sliding supports at its ends carried by said main frame.

2. In a device of the class described, the combination of a frame, a rear axle, side springs constituting connections of fixed radius between said axle and frame, a propeller shaft, gearing connecting said shaft and axle, transmission gearing, driving devices connecting said transmission gearing and the front end of said shaft and permitting longitudinal slip, a cross member supporting the front end of said shaft, and supports carried by said frame for the ends of said member permitting movement of said member longitudinally of the frame.

3. As a means for rebuilding an assembly comprising a main frame, a rear axle secured thereto, a propeller shaft, gearing connecting said axle and said shaft and preventing longitudinal motion of said shaft, and transmission mechanism carried by said frame and connected without longitudinal slip to said shaft, the combination of an extension frame for connection with said main frame to support said assembled axle and shaft disconnected from said transmission gearing to the rear of their original position relatively to said transmission gearing, side springs constituting connections of fixed radius between said axle and extension frame, a cross member for supporting the front end of said shaft, said member having supports at its ends permitting sliding movement, and driving devices having longitudinal slip for connecting said transmission gearing with the front end of said shaft.

4. As a means for rebuilding an assembly comprising a main frame, a rear axle secured thereto, a propeller shaft, gearing connecting said axle and said shaft and preventing longitudinal motion of said shaft, and transmission mechanism carried by said frame and connected without longitudinal slip to said shaft, the combination of an extension frame for connection with said main frame to support said assembled axle and shaft disconnected from said transmission gearing to the rear of their original position relatively to said transmission gearing, side springs constituting connections of fixed radius between said axle and extension frame, a cross member for supporting the front end of said shaft, said member having supports at its ends permitting sliding movement, driving devices having longitudinal slip for connecting said transmission gearing with the front end of said shaft, and radius rods extending between the supports for said rear axle and said member.

In witness whereof I hereunto subscribe my name this 31st day of January, A. D. 1920.

HOWARD R. BRUAH.